(12) United States Patent
Koh

(10) Patent No.: US 10,164,424 B2
(45) Date of Patent: Dec. 25, 2018

(54) HIGH PRECISION LOW-VOLTAGE OUTPUT LIMITER

(71) Applicant: Rockwell Automation Asia Pacific Business Center. Pte. Ltd., Singapore (SG)

(72) Inventor: Kian Kiat Koh, Singapore (SG)

(73) Assignee: Rockwell Automation Asia Pacific Business Center. Pte. Ltd., Singapore (SG)

( * ) Notice: Subject to any disclaimer, the term of this patent is extended or adjusted under 35 U.S.C. 154(b) by 427 days.

(21) Appl. No.: 15/072,899

(22) Filed: Mar. 17, 2016

(65) Prior Publication Data

US 2017/0271868 A1 Sep. 21, 2017

(51) Int. Cl.
*H02H 9/04* (2006.01)

(52) U.S. Cl.
CPC .......... *H02H 9/046* (2013.01); *H02H 9/044* (2013.01)

(58) Field of Classification Search
CPC ................................ H02H 9/04; H02H 9/041
USPC ......................................................... 361/91.1
See application file for complete search history.

(56) References Cited

U.S. PATENT DOCUMENTS

| | | | |
|---|---|---|---|
| 6,538,866 B1 * | 3/2003 | Hanzawa | H01L 27/0251 361/111 |
| 7,394,223 B2 * | 7/2008 | Lai | H02J 7/0031 320/134 |
| 8,537,517 B1 * | 9/2013 | Banak | H02H 11/002 361/93.1 |
| 2016/0072274 A1 * | 3/2016 | Chang | H02H 3/38 361/90 |

* cited by examiner

*Primary Examiner* — Dharti Patel
(74) *Attorney, Agent, or Firm* — Boyle Fredrickson, SC

(57) ABSTRACT

An overvoltage protector uses a low-power shunt regulator to provide precise overvoltage protection at low voltages. The shunt regulator communicates with the current limiter to the input voltage allowing precise current measurement while protecting the shunt regulator from excessive power consumption.

20 Claims, 1 Drawing Sheet

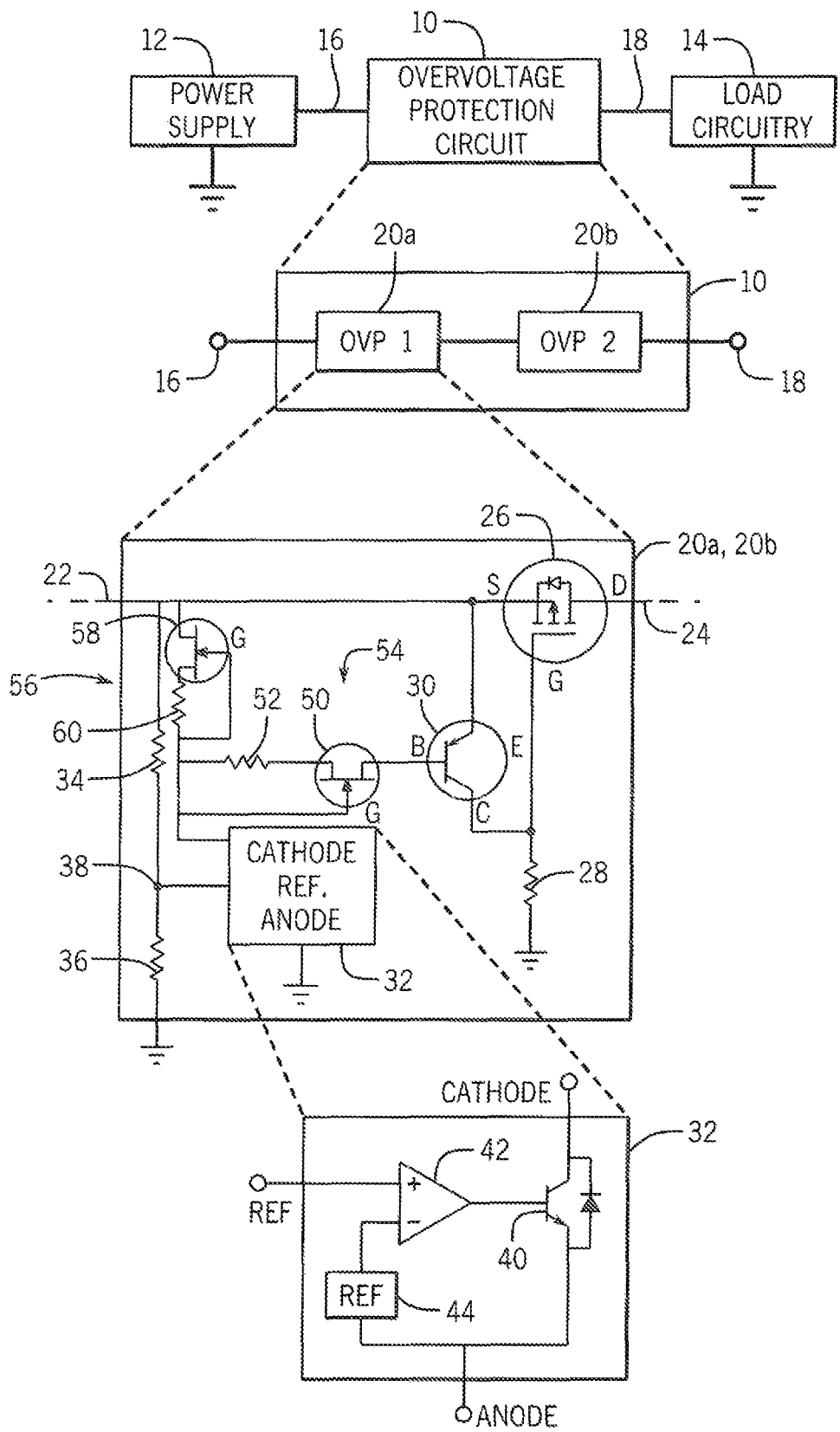

HIGH PRECISION LOW-VOLTAGE OUTPUT LIMITER

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to output voltage limiters for power supplies and the like and in particular to a low-voltage output limiter with high precision.

Electrical circuits normally operate in conjunction with a power supply delivering required voltage and current levels to the electrical circuitry. Particularly in safety and high reliability applications, it may be desirable that the power supply include output limiting circuitry for controlling output power from the power supply, for example, in the event of a short circuit across power supply output terminals or an increase in power supply voltage such as would cause the electrical circuit to consume additional power. In some applications, the outlet limiting circuitry must operate accurately at low voltages, for example, on the order of 3 to 4 volts (with 5% tolerance), while accommodating much higher voltages of up to 36 volts.

One way of providing such output limiting circuitry is to use a zener diode to control the biasing of a series transistor through which current must pass from the power supply to the electrical circuitry. As the voltage rises, the zener diode will limit the biasing of the series transistor thus decreasing the current flow between the power supply and electrical circuitry for protection. Such an approach normally requires that the zener diodes be screened and tested for low leakage current in order to provide such accurate level protection across a wide-temperature range required of industrial applications.

An alternative is to use a specialized integrated circuit that can monitor the output voltage of the power supply up to the highest expected voltage (e.g., 36 volts). Such integrated circuits may provide a precise comparator producing a switched output at a desired limited voltage. The switched output can then control a series transistor in place of the zener diode. The problem to this approach is that such integrated circuits that can tolerate high operating voltages are expensive

SUMMARY OF THE INVENTION

The present invention provides an output protection circuit that uses a lower-cost, power integrated circuit such as a shunt regulator to provide accurate sensing of overvoltage conditions. The shunt regulator is protected from excessive power consumption from high input voltages by a current limiter allowing a low-voltage part to be used to effectively sense high input voltages without being exposed directly to high input voltages.

In one embodiment, the invention provides an overvoltage protection circuit having an input terminal for receiving power from a power source providing a voltage and an output terminal for providing power to an electrical circuit downstream from the overvoltage protection circuit. A series limiting solid-state device, such as, but not limited to, a transistor, operating in a continuous fashion or as a switching device, is positioned between the input terminal and output terminal for controlling current flow there between and a shunt regulator provides a signal controlling the bias of the series limiting device to decrease current flow through the series limiting device when the voltage at the input terminal rises above a predetermined voltage threshold measured by the shunt regulator. A first current limiter communicates between the shunt regulator and the input terminal to protect the shunt regulator from voltages on the input terminal higher than a voltage rating of the shunt regulator.

It is thus a feature of at least one embodiment of the invention to allow the use of a flow power shunt regulator to provide precise low-voltage overvoltage protection without damage to the shunt regulator with occasional expected high voltages.

The shunt regulator may communicate with the bias control transistor through a second current limiter.

It is thus a feature of at least one embodiment of the invention to protect the shunt regulator from high voltages associated with controlling the series limiting device.

In one embodiment, both of the first current limiter and second current limiter may operate as constant current sources.

It is thus a feature of at least one embodiment of the invention to provide for a precise switching point for the overvoltage control despite removal of the shunt regulator from direct control of the series limiting device. This can be contrasted to a resistor network which would provide a lower gain control path.

These particular objects and advantages may apply to only some embodiments falling within the claims and thus do not define the scope of the invention.

BRIEF DESCRIPTION OF THE DRAWINGS

FIG. 1 is a diagram of an overvoltage protection circuit positionable between the power supply in load circuitry comprised of two overvoltage protection modules each using a shunt regulator as shown in successive expansions.

DETAILED DESCRIPTION OF THE PREFERRED EMBODIMENT

Referring now to FIG. 1, an overvoltage protection circuit 10 may be positioned between a power supply 12 and load circuitry 14 to protect the load circuitry 14 from excessive power consumption cost, for example, by failure of the power supply 12 such as may produce high voltages. Generally the higher voltages received correctly by the load circuitry 14 may exceed voltage ratings of components on circuitry 14 or may cause excessive power consumption that can be damaging to those components. Generally, the overvoltage protection circuit 10 includes an input terminal 16 receiving power from the power supply 12 and an output terminal 18 for providing output power to the circuitry 14.

In one embodiment of the present invention the overvoltage protection circuit 10 may include a first overvoltage protection circuit 20a connected in series with a second overvoltage protection circuit 20b. Generally both overvoltage protection circuits 20 operate at the same voltage threshold and provide redundancy in the event of failure of one or the other. Current flowing from the power supply 12 must flow through both overvoltage protection circuits 20 before reaching the load circuitry 14.

Each overvoltage protection circuit 20 may in turn provide an input terminal 22 and an output terminal 24 with the input terminal 22 of overvoltage protection circuit 20a connected with input terminal 16 and the output terminal 24 of overvoltage protection circuit 20b connected to output terminal 18. The output terminal 24 of overvoltage protection circuit 20a connects to the input terminal 22 of overvoltage protection circuit 20b.

In series between the input terminal 22 and output terminal 24 is a series current limiting solid-state device 26. In one embodiment, series current limiting solid state device 26 may be a metal oxide silica and field effect transistor (MOSFET) having a source connected to input terminal 22 and a drain connected to output terminal 24. The gate may connect through a bias resistor 28 to ground. The biasing of the series current limiting solid state device 26 is provided by a PNP transistor 30 having its emitter connected to the junction between bias resistor 28 and the gate of series current limiting solid state device 26. The emitter of PNP transistor 30 is connected to the input terminal 22. When transistor 30 conducts, it raises the voltage on bias resistor 28 turning off or reducing the current flow through the source and drain of series current limiting solid state device 26.

The transistor 30 may be controlled by a shunt current regulator 32, for example, a programmable precision reference shunt regulator manufactured by a variety of companies under the tradename of NCV431. Such a shunt current regulator 32 has three terminals only including a cathode terminal, a reference terminal, and an anode terminal. The latter is connected to ground and the reference terminal connects to a voltage derived from the voltage at the input terminal 22 through a resistive divider comprised of resistors 34 and 36 in series connection with resistor 34 connecting to input terminal 22 and then to a junction 38 with resistor 36 which in turn leads to ground. This resistor divider may, for example, reduce the voltage on the input terminal 22 by two-thirds so as to stay comfortably within the voltage limits of the shunt current regulator 32

As is generally understood in the art, a series shunt regulator may provide for an internal transistor, for example, a PNP transistor 40 conducting current between the cathode and anode as biased by an operational amplifier 42. The operational amplifier 42 receives at its positive or noninverting input a signal from the reference input and edits negative input at a precision voltage reference 44 biased with respect to ground on the anode. When the voltage on the reference exceeds the voltage of the precision voltage reference 44, the transistor 40 conducts. The operational amplifier 42 will have a high gain so that the operation of the transistor 40 is to turn on sharply when the voltage programmed into the shunt current regulator 32 is exceeded at the reference input.

Generally the amount of current received at the cathode must be limited so as not to exceed the power rating of the shunt current regulator 32 and thus the shunt current regulator 32 could not normally be connected directly to the base of bias transistor 30. For this reason it connects through a current limiter 54 formed by JFET 50 providing a path from the base of transistor 30 through the drain and source of JFET 50 then through a current sensing resistor 52 to the cathode of the shunt current regulator 32. The gate of the JFET 50 is connected directly to the cathode of the shunt current regulator 32 and in this way the JFET 50 is programmed to operate as a substantially constant current source with increased current through current sensing resistor 52 providing a biasing of the JFET 50 tending to turn it toward the off state. In this way the amount of current received by the cathode of the shunt current regulator 32 is limited. The cathode of shunt current regulator 32 also connects with a current limiter circuit 56 formed of a JFET 58 and connecting between the input terminal 22 and the cathode of the shunt current regulator 32. The JFET 58 provides a path from input terminal 22 through its source and drain and then through current sensing resistor 62 to the cathode of shunt current regulator 32. The gate of JFET 58 connects to the cathode of shunt current regulator 32 to provide feedback that tends to provide constant current flow through the JFET 58. In this way high voltages on input terminal 22 do not create excessive current input to the cathode of the shunt current regulator 32.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What I claim is:

1. An overvoltage protection circuit comprising:
   an input terminal for receiving power from a power source providing a voltage;
   an output terminal for providing power to an electrical circuit downstream from the overvoltage protection circuit;
   a series limiting solid state device between the input terminal and output terminal for controlling current flow therebetween;
   a shunt regulator for providing a signal controlling a biasing of the series limiting device to decrease current flow through the series limiting solid state device when the voltage at the input terminal rises above a predetermined voltage threshold measured by the shunt regulator; and a first current limiter communicating between the shunt regulator and the input terminal to protect the shunt regulator from voltages on the input terminal higher than a voltage rating of the shunt regulator.

2. The overvoltage protection circuit of claim 1 wherein the shunt regulator is an integrated circuit.

3. The overvoltage protection circuit of claim 2 wherein the shunt regulator provides only three terminals.

4. The overvoltage protection circuit of claim 3 wherein the shunt regulator includes a precision voltage reference and a comparator comparing a voltage of the precision voltage reference to a reference input to drive the output transistor conducting electricity from a cathode input to an anode output.

5. The overvoltage protection circuit of claim 1 wherein the first current limiter operates as a constant current source.

6. The overvoltage protection circuit of claim 5 wherein the first current limiter is a JFET transistor having a drain and a source and a gate and wherein the gate receives a signal determined by a resistor measuring current passing through the JFET transistor.

7. The overvoltage protection circuit of claim 1 further including a bias control transistor controlling the bias of the series limiting device according to the signal from the shunt regulator.

8. The overvoltage protection circuit of claim 7 wherein the shunt regulator communicates with the bias control transistor through a second current limiter.

9. The overvoltage protection circuit of claim 8 wherein the second current limiter operates as a constant current source.

10. The overvoltage protection circuit of claim 9 wherein the second current limiter is a JFET transistor having a drain and a source and a gate and wherein the gate receives a signal determined by a resistor measuring current passing through the JFET transistor.

11. The overvoltage protection circuit of claim 1 wherein the series limiting device is a metal oxide semiconductor field effect transistor having a gate communicating to ground through a bias resistor and wherein the bias control transistor provides current to a junction between the series limiting device gate and the bias resistor.

12. The overvoltage protection circuit of claim 11 wherein the bias transistor is a PNP transistor having its emitter communicating with the input terminal and its collector communicating with the junction between the series limiting device gate and bias resistor.

13. The overvoltage protection circuit of claim 1 further including a power supply providing power to the input terminal and electronic circuit providing a load receiving power from the output terminal.

14. The overvoltage protection circuit of claim 1 further including:
a second series limiting device between the input terminal and output terminal for controlling current flow therebetween, the second series limiting device in series with the series limiting device to receive current from an output of the series limiting device;
a second shunt regulator for providing a signal controlling the bias of the second series limiting device to decrease current flow through the second series limiting device when the voltage at the output of the series limiting device rises above a predetermined voltage threshold measured by the second shunt regulator;
a third current limiter communicating between the second shunt regulator and the output of the series limiting device to protect the second shunt regulator from voltages on the output of the first series limiting device higher than a voltage rating of the second shunt regulator.

15. The overvoltage protection circuit of claim 14 further including a power supply providing power to the input terminal and electronic circuit providing a load receiving power from the output terminal.

16. A method of providing overvoltage protection employing a circuit comprising:
(a) providing an input terminal for receiving power from a power source providing a voltage;
(b) providing an output terminal for providing power to an electrical circuit downstream from the overvoltage protection circuit;
(c) connecting a series limiting solid state device between the input terminal and output terminal for controlling current flow therebetween;
(d) using a shunt regulator for providing a signal controlling a biasing of the series limiting device to decrease current flow through the series limiting solid state device when the voltage at the input terminal rises above a predetermined voltage threshold measured by the shunt regulator; and
(e) communicating between the shunt regulator and the input terminal with a first current limiter to protect the shunt regulator from voltages on the input terminal higher than a voltage rating of the shunt regulator while otherwise allowing sensing of the voltage of the input terminal.

17. The method of claim 16 wherein the shunt regulator is an integrated circuit.

18. The method of claim 17 wherein the shunt regulator provides only three terminals.

19. The method of claim 18 wherein the shunt regulator includes a precision voltage reference and a comparator comparing a voltage of the precision voltage reference to a reference input to drive the output transistor conducting electricity from a cathode input to an anode output.

20. The method of claim 19 further including connecting a power supply to the input terminal and electronic circuit and connecting a load to receive power from the output terminal.

* * * * *